Dec. 19, 1933.  J. C. DALEY  1,939,668
MEANS FOR MAKING CORE LAMINATIONS
Filed June 16, 1930   3 Sheets-Sheet 1

Inventor:
James C. Daley.
By Brown, Jackson, Boettcher & Dienner
Attys.

Dec. 19, 1933.   J. C. DALEY   1,939,668
MEANS FOR MAKING CORE LAMINATIONS
Filed June 16, 1930   3 Sheets-Sheet 2
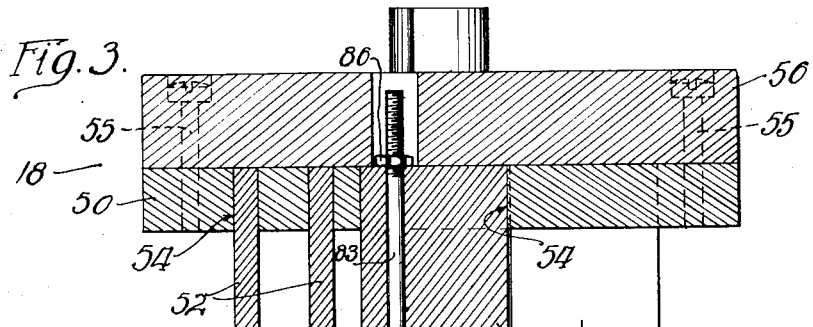
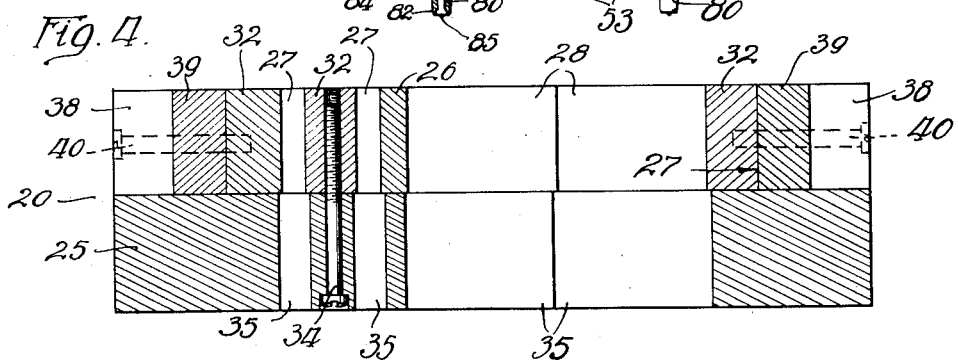
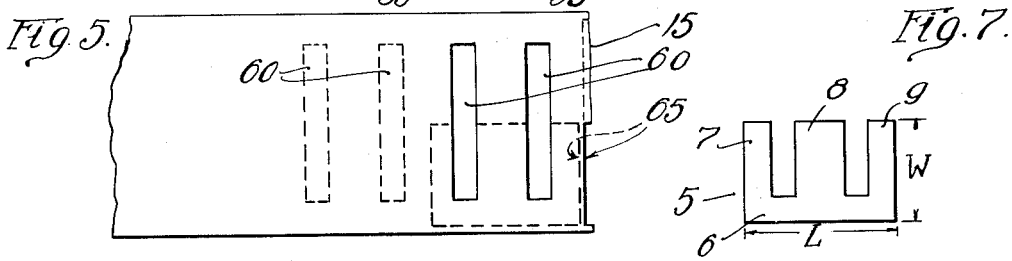
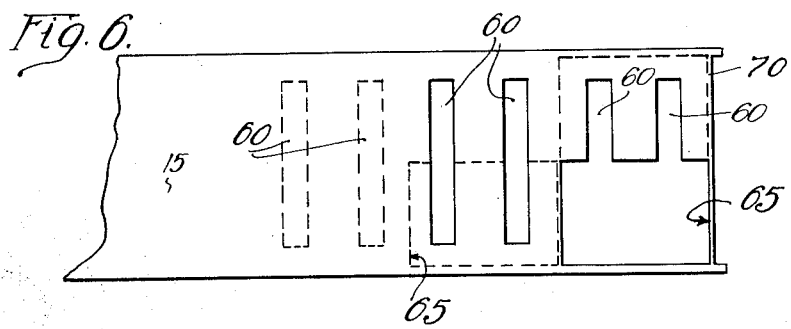
Inventor:
James C. Daley
By Brown, Jackson, Boettcher & Dienner
Attys.

Dec. 19, 1933.　　　　　J. C. DALEY　　　　　1,939,668
MEANS FOR MAKING CORE LAMINATIONS
Filed June 16, 1930　　　3 Sheets-Sheet 3
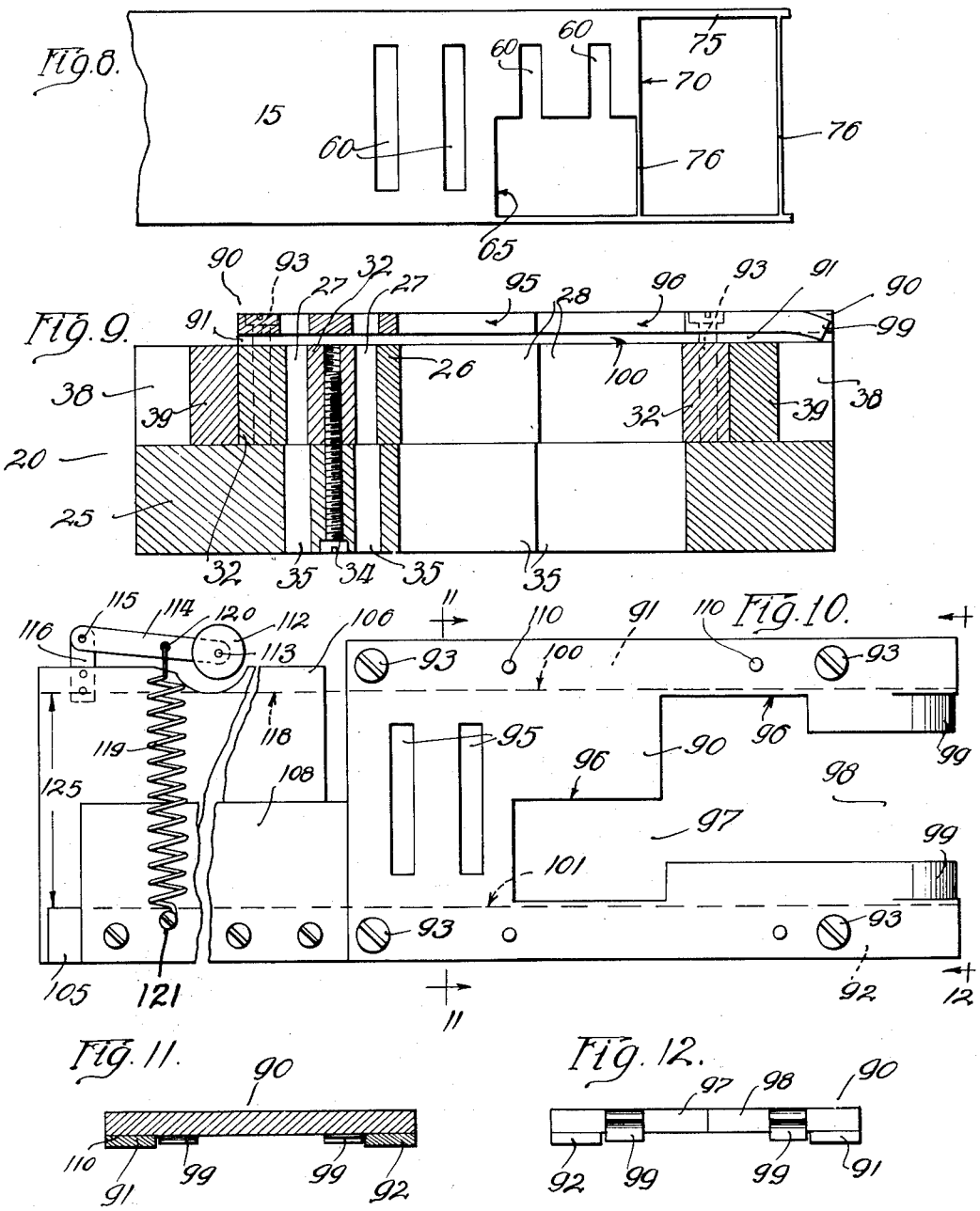
Inventor:
James C. Daley.
By Brown, Jackson, Boettcher & Dienner
Attys.

Patented Dec. 19, 1933

1,939,668

UNITED STATES PATENT OFFICE 1,939,668

MEANS FOR MAKING CORE LAMINATIONS

James C. Daley, Chicago, Ill., assignor to Jefferson Electric Company, Chicago, Ill., a corporation of Illinois Application June 16, 1930. Serial No. 461,433

4 Claims. (Cl. 164—18)

My invention relates to core laminations, particularly for use in transformer cores and the like, and contemplates an improved method of and means for making these laminations.

More particularly my invention resides in forming the laminations from continuous strips of sheet metal with a minimum amount of waste, and in such manner that the laminations may be cut to shape on all sides, whereby uniformity of shape and size may be assured, the outer contour of the laminations may be shaped as desired and preliminary stock trimming or cutting steps may be eliminated.

According to the present invention the laminations are formed from the strips of sheet metal by cutting successive pairs of oblong openings transversely of and entirely within the width of the strip and severing the strip longitudinally thereof across the transverse openings and along the edges of the strip and also transversely of the strip between each pair of transverse openings to form E-shaped bodies.

The means for accomplishing the foregoing comprises cooperating punch and die members, there being one set of punch and die members for removing the material from between the legs of both subsequently formed E members and other sets of rectangular punch and die members positioned in staggered relation, one set at either side of the center line of the path of travel of the strip for cutting or blocking out the laminations from each side of the strip on successive strokes of the press.

The invention also provides means for guiding the strip between the punch and die means, and means for positioning the strip so that the oblong openings formed along one portion of the punch and die means will be properly correlated with respect to the blocking out or outer contour forming punch and die means along the succeeding portion of the punch and die means.

Where the die is sectionalized the invention reduces the number of die sections and simplifies their arrangement and relative positioning over the arrangements heretofore provided for cutting the laminations to shape on all sides.

The invention also provides means for stripping the strip from the movable punch means.

While any suitable or preferred material may be employed, the laminations are commonly made of sheet iron and the present invention enables producing the laminations at a relatively fast rate, inexpensively and with little waste.

The width of the stock preferably exceeds slightly the combined widths of the staggered blocking out or outer contour forming punch and die members, and the guides are preferably spaced slightly from the outer sides of the staggered die openings, whereby the laminations are not only cut to shape along the outer sides but a narrow strip of material will remain at each side of the strip after the punching operations have been completed. These narrow strips may be used to advance the strip between the punch and die means.

My invention is illustrated in the accompanying drawings in which:

Figure 3 is a longitudinal section taken on the line 3—3 of Figure 1;

Figure 4 is a longitudinal section taken on the line 4—4 of Figure 2, Figure 4 being positioned below Figure 3 to show the operative relation of the punch and die means;

Figure 5 is a fragmentary plan view of the strip of stock after punching the same with the first portion of the punch and die means, a portion of the succeeding punching operation being indicated in dotted lines;

Figure 6 is a view similar to Figure 5 showing the completed punching operation which after the sheet metal strip is fully between the punch and die means is repeated along the strip as it is advanced step by step between the punch and die means;

Figure 7 is a plan view of one of the E-shaped laminations;

Figure 8 is a view similar to Figures 5 and 6 showing the stock after the complete punching operation shown in dotted lines in Figure 6;

Figure 9 is a view similar to Figure 4 showing the means for stripping the stock from the upper punch and for guiding the stock between the punch and die means;

Figure 10 is a top plan view of the stripper means;

Figure 11 is a transverse section through the stripper means on the line 11—11 of Figure 10;

Figure 12 is an end view of one end of the stripper; and

Figure 13 is a view illustrating one manner of making a core with the E-shaped laminations and rectangular strips formed by the present invention.

Figure 1:
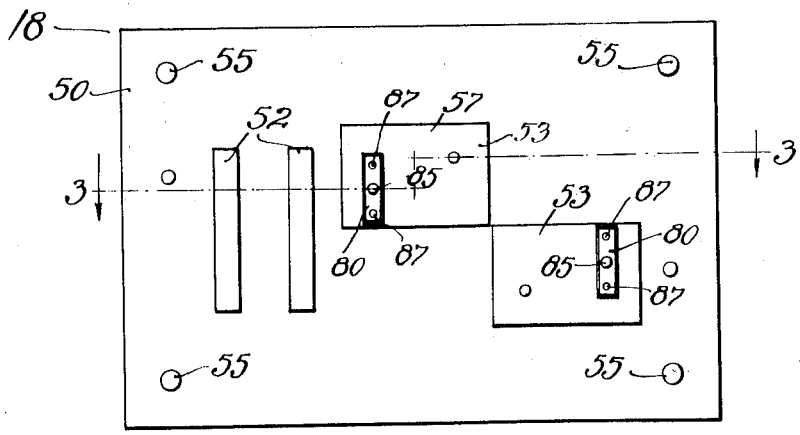
Figure 1 is a bottom plan view of the upper movable punch means.

Referring to the drawings, each lamination 5 (Figure 7) is of E configuration, having a base 6 and three legs 7, 8 and 9 parallel with each other and at right angles to the base. The laminations formed by each set of blocking out punch and die means may be identical in contour and dimension, although this might vary. The intermediate legs disposed centrally between the outer legs 7 and 9 may be wider than the outer legs, as shown. The bases 6 may be of substantially the same width or slightly wider than the outer legs 7 and 9, although this too may vary.

In making up the transformer core the laminations may be stacked with the legs 7, 8 and 9 upon each other and with the bases disposed alternately at opposite ends. The rectangular strips cut from the openings which form the spaces between the legs 7, 8 and 9 may be of lengths equal to the lengths L (Figure 7) of the lamination, as shown in Figures 5, 7 and 13, and may be arranged across the legs 7, 8 and 9, as shown in Figure 13, to form a core. Where the straight strips are used, as shown in Figure 13, the bases 6 need not, of course, be disposed alternately at opposite ends but may all be disposed at the same end, although the use of the straight strips may be combined with the arrangement of the bases of the laminations alternately at opposite ends.

As well understood in the art, the coils may be wound around the intermediate legs 8 and through the spaces between the intermediate and outer legs, the intermediate legs extending through the coils and the outer legs together with the bases 6 forming a magnetic envelope surrounding the coils.

The stock from which the laminations are made is in the form of continuous strips 15 of sheet metal. The strips 15 are preferably long, relatively narrow strips and are substantially flat and may, of course, be of any suitable or preferred gauge or thickness. Sheet iron is commonly employed, and the laminations may be punched or stamped out cold.

Figure 2:
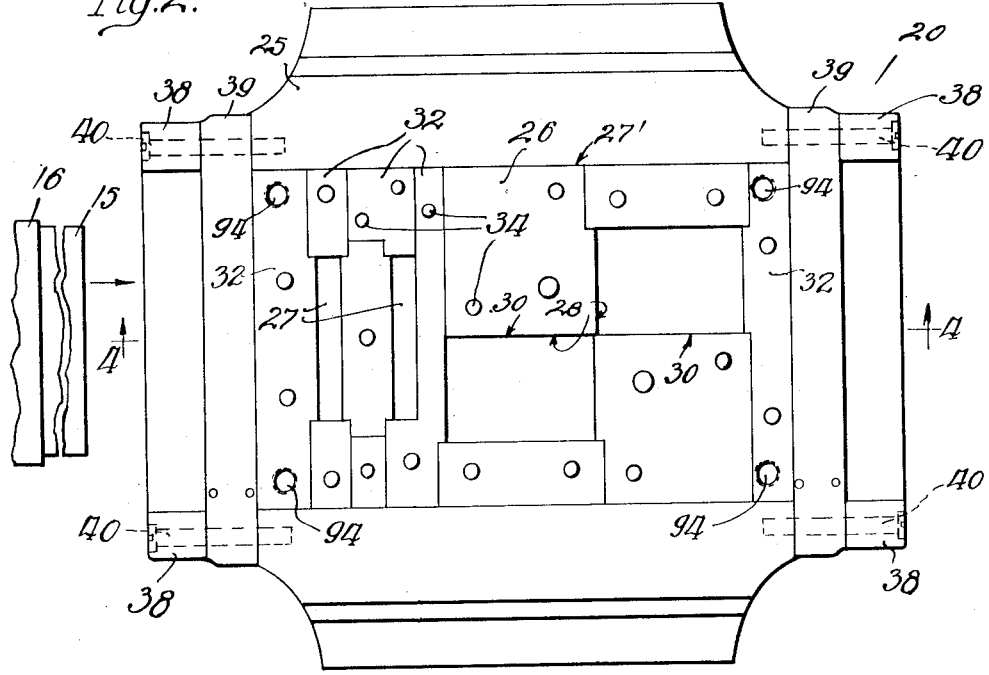
Figure 2 is a top plan view of the lower die means.

For the purpose of punching or stamping the laminations, the strip 15 is fed by suitable means designated diagrammatically at 16 in Figure 2 between the upper punch and lower die means 18 and 20 of a suitable press, the strip 15 being suitably guided and fed over the lower die 20. The strip is advanced between the punch and die means step by step, the steps of advance alternating with the strokes of the press so that after each stroke the strip will be advanced and positioned for the next stroke.

The lower die 20 comprises a die block 25 fastened down upon the bed of the press, and secured in the opening 27 in the die block is the die proper 26. The die 26 is provided with two parallel oblong or generally rectangular die openings 27 with their lengths disposed transversely across the path of movement of the strip between the punch and die means and with two generally rectangular die openings 28. The die openings 28 are the openings for blocking out or forming the outer contours of the lamination, and they are positioned in staggered relation one at each side of the center line of the path of travel of the strip. The openings 27 with their cooperating punches are the openings and punches for removing the material from between the legs of the subsequently formed E-laminations.

Die openings 27 and 28 are all bounded by relatively sharp cutting edges, and the widths of the openings 27 are substantially equal to the widths of the spaces between the legs 7, 8 and 9 of the laminations, whereas the length of each opening 27 is substantially equal to twice the length of the space between the legs 7, 8 and 9. The cutting edges 30 of openings 28 are aligned on a longitudinal median line through the openings 27 centrally between their opposite ends, or centrally of the path of travel of the strip. The lengths of the openings 28 are preferably substantially equal to the lengths L (Figure 7) of the lamination, while the widths of the openings 28 are substantially equal to the width W of the resulting lamination (Figure 7).

The die 26 may be made up of a plurality of blocks 32 secured to the die block 25 at 34 (Figures 2 and 4), the die block 25 having openings 35 corresponding with and underlying the openings 27 and 28, and these openings 35 are preferably slightly larger than the die openings 27 and 28 so that the stampings may drop freely through the block 25. The meeting corners of the die members 32 may be jogged or interlocked, as shown, to hold them more effectively against relative displacement. The block 25 has upright integral corner pillars 38 and cross bars 39 are arranged between the ends of the die 26 and these corner pillars 38. The bars 39 may be secured in the die block 25 by bolts 40.

The cooperating upper punch means 18 is reciprocable up and down into and out of cooperation with the lower die means. It comprises a block 50 in which the upper ends of the upper punch members 52 and 53 are secured at 54, and this block is, in turn, secured by screws 55 to a block 56 which may be mounted upon the vertically reciprocating carriage of the press. The punch members 52 are bounded by relatively sharp cutting edges and conform peripherally with the die openings 27, whereas the punch members 53 are likewise bounded by relatively sharp cutting edges and conform peripherally with the die openings 28. The downward stroke of the punch carriage or block 56 moves the punches 52 down into the mating die openings 27 and the punches 53 down into the mating die openings 28, and upon the upward movement of the punch carriage the punches are elevated from the die openings to substantially the position shown in Figures 3 and 4.

The sheet metal strip 15 is fed between the punch and die members in the direction indicated by the arrow in Figure 2. Assuming that the sheet metal strip is initially entered with its inner end at or slightly to the right of the left hand end of the lower or left hand die opening 28, the initial stroke of the press will move the punch members 52 down through the strip and into the mating die opening 27, cutting out a pair of oblong openings 60 transversely of and entirely within the strip. If the inner end of the strip is positioned at the left hand edge of the lower die opening 28, it may form the right hand ends of the initial pair of laminations punched from the strip, or if it is entered slightly further than the left hand edge of the lower die opening 28 the right hand ends of the initial pair of laminations punched from the strip will be punched to shape by punches 53 and their cooperating die openings 28, as will hereinafter appear. Upon the succeeding upward movement of the punch means the punch members are withdrawn from the die openings and the feeding mechanism 16 then functions to feed the strip 15 forwardly sufficiently to dispose an imaginary transverse line centrally between the openings 27 coincident with an imaginary transverse line centrally between the opposite ends of the longitudinal dimension of the next adjacent die opening 28.

Upon the next succeeding stroke of the punch means the left hand punch 53 (Figure 1) passes through the strip as indicated by the dotted lines 65 in Figure 5, and down into the mating left hand die opening 28 (Figure 2). The openings 60 having been advanced to the positions shown in full lines in Figure 5 prior to the blocking out of the lamination at 65, the next succeeding pair of oblong openings 60 are punched simultaneously with the blocking out operation 65.

The punch members are then again withdrawn vertically from their mating die openings and the feeding mechanism 16 functions to feed the opening 65 into transverse alignment with the succeeding die opening 28. Then upon the succeeding stroke of the punch means the punch members 53, 53 and 52, 52 all pass through the strip and into their mating die openings simultaneously blocking out the outer contours of a pair of staggered laminations and punching a pair of oblong openings 60 for removing the material from between the legs of the subsequently formed E members, the straight strips removed in the punching of these openings being adapted to be used in building up the core as already pointed out.

All succeeding depressions of the punch means simultaneously punch or stamp out the diagonally opposite or staggered openings 65 and 70, and the succeeding transversely disposed oblong openings 60 until, of course, the end of the particular strip is reached. It is understood that in succeeding operations when the dies are separated the feeding mechanism feeds the openings 60 from the positions shown in dotted lines in Figures 5 and 6 to the next adjacent positions shown in full lines in the same figures. This disposes one half of the length of each of said openings between the left hand die opening 28 (Figure 2) and its cooperating punch 53, and the halves of said openings 60 remaining (Figure 6) after blanking out the lamination 65 are moved into the position shown in Figure 6 between the right hand die opening 28 and its cooperating punch 53 for forming the diagonally opposite or staggered lamination 70, as shown in Figure 6.

The sheet metal strip after the punching and blanking out steps of Figures 5 and 6 is indicated in Figure 8, and it will be apparent from this figure that the width of the stock preferably exceeds slightly the combined widths of the staggered blocking out or outer contour forming punch and die means 28, 53, whereby the laminations are not only cut to shape along the outer sides but a narrow strip of material will remain at each side of the strip after the punching operations have been completed. These narrow strips tie the waste together so that it may be fed continuously from the machine in the operation thereof, and these narrow strips may be used to advance the strip between the punch and die means. From the foregoing it will be apparent that the laminations are cut to shape on all sides, whereby uniformity of shape and size may be assured and the outer contour of the laminations may be shaped as desired.

For the purpose of assuring proper positioning of the stock with its punched openings 60 with respect to the die openings 28 and the cooperating punch members 53, each of the punch members 53 is provided on its undersurface with a generally rectangular pilot or positioning block 80. These blocks 80 are parallel and transversely elongated with their widths substantially equal to the widths of the openings 60 produced by the die openings 27 and punch members 52, and the opposite sides 82 of the blocks 80 are preferably tapered downwardly, as shown in Figures 1 and 3, so that when the openings 60 are disposed beneath the blocks 80 the narrower lower ends of the blocks 80 will enter the openings 60 in spite of lack of complete registration, and upon depression of the punch means the upwardly flaring side 82 will pilot the stock forwardly or rearwardly to proper position and will retain same in that position in the operation of the press.

The blocks 80 may be rigidly secured to the undersides of the die members 53 by pins 83 (Figure 3) having reduced lower ends 84 passing through the blocks 80 and riveted over at 85. The upper ends of the pins 83 have threaded engagement with nuts 86 which are adapted to be brought up into engagement with the top of the block 50 or with the top of the punch member to clamp the blocks 80 upon the punch members. Dowel pins 87 may be provided for additionally securing the blocks 80 in place, and particularly for preventing turning thereof. Of course the positioning members 80 may be secured to the die members 53 in any other suitable or preferred manner.

For the purpose of stripping the sheet metal strip from the punch members as these members are separated from the lower die means following each punching operation, the die means is surmounted by a stripper plate 90 spaced above the die blocks 32 along one longitudinal margin of the plate 90 by a spacer strip 91 and similarly spaced along the opposite longitudinal margin by a spacer strip or bar 92. Plate 90 and spacer members 91 and 92 are fastened to the lower die means by screws 93 which have threaded engagement in openings 94 (Figure 2) in the lower die blocks 32. The stripper plate 90 is provided with openings 95 registering with the die openings 27 so that the punch members 52 may pass therethrough and with openings 96 registering with the die openings 28 so that the punch members 53 may likewise pass through the stripper plate and into the lower die openings. The openings 96 may have open communication at 97 and the right hand end of the stripper plate (Figures 9 and 10) may be open at 98 with lips 99 turned down as indicated in Figures 10 and 12. The down turned lips 99 free the sheet metal strip from the underside of the stripper plate. The inner edges 100 and 101 of the spacer strips 91 and 92 are spaced apart a distance equal or substantially equal to the width of the sheet metal strips, and by their cooperation with the opposite edges of the strip guide the same properly between the punch and the members. These strips 91 and 92, therefore, in addition to forming spacer strips for the stripper plate form guides on the die means between which the sheet metal strip is advanced step by step.

One of the spacer strips or bars, as for example, the bar 92, is extended at 105 and secured to this extension is a stock supporting plate 106 over which the sheet metal strip is fed between the punch and die means. The plate 106 is secured to the extension 105 and also secured to this extension is an overlying plate 108 spaced vertically from the plate 106. The sheet metal strip or stock is fed in between the plates 106 and 108. The strip 91 may be riveted or permanently secured at 110 to the bottom of the plate 90, and the strip 92 is preferably interposed between the die means and the bottom of the plate 90 and secured with the die means to the plate 90 by the screws 93.

In order to take care of any irregularity or variation in the width of the sheet metal strip I provide for constantly and yieldingly pressing one edge of the strip against the edge 101 at all times by means of a spring pressed roller 112 (Figure 10) rotatably mounted at 113 on the free end of an arm 114, which arm 114 is pivoted at 115 upon a lug or ear 116 rigidly secured to and projecting laterally from the plate 106. The roller 112 is yieldingly urged into engagement with the adjacent edge of the stock as indicated more or less diagrammatically at 118, by means of a spring 119, secured at one end at 120 to the pivoted arm 114 and anchored at its opposite end at 121 upon the stripper assembly. The width of the stock is indicated more or less illustratively at 125 in Figure 10.

I do not intend to be limited to the precise details shown or described.

I claim:

1. In combination, a die having a pair of relatively narrow openings and a pair of generally rectangular openings staggered with respect to each other and with one longitudinal edge of each on a line normal the lengths of said first openings and intermediate the ends thereof, a cooperating punch having complementary punch elements movable into and out of said die openings for punching openings and severing the strip longitudinally thereof across said openings and along the edges of the strip and also transversely between said openings, means for feeding a strip of sheet metal between said punch and die openings, and means carried by certain of said openings and extending out of the plane thereof for cooperation with the openings punched in said strip and across and around which the strip is severed to align said sheet metal strip for the next successive punching operation.

2. In combination, a die having a pair of relatively narrow openings and a pair of generally rectangular openings staggered with respect to each other and with one longitudinal edge of each on a line normal the lengths of said first openings and intermediate the ends thereof, a cooperating punch having complementary punch elements movable into and out of said die openings for punching openings and severing the strip longitudinally thereof across said openings and along the edges of the strip and also transversely between said openings, means for feeding a strip of sheet metal between said punch and die openings, and means comprising tapered transversely elongated members extending out of the plane of certain of said punch elements and cooperating with the openings punched in said strip and across and around which the strip is severed to align said strip.

3. In combination, a bed plate, a die secured thereon and having a pair of relatively elongated narrow die openings and a pair of generally rectangular openings staggered with respect to each other and with one longitudinal edge of each on a line normal the lengths of said first openings and intermediate the ends thereof, a punch having complementary punch elements movable into and out of said die openings, stripping means comprising a plate having openings providing for passage of said punch elements therethrough, said stripping means being spaced from and secured to said die, means for feeding a strip of sheet metal between said die openings and said stripping means, and downturned lips formed at one end of said stripping means and engaging said strip of sheet metal as it is fed past said die openings.

4. In combination, a bed plate, a die secured thereon and having a pair of relatively elongated narrow die openings and a pair of generally rectangular openings staggered with respect to each other and with one longitudinal edge of each on a line normal the lengths of said first openings and intermediate the ends thereof, a punch having complementary punch elements movable into and out of said die openings, stripping means secured to said die and comprising a plate having openings providing for passage of said punch elements therethrough, means for spacing said plate from said die, means for feeding a strip of sheet metal between said die and said stripping means, downturned lips formed on said stripping means adjacent one end thereof engaging said strip of sheet metal as it is fed over said die, and resilient means carried by said spacing means at the opposite end of said stripping means for engagement with a longitudinal edge of the strip to guide said strip over said die and between said spacing means.

JAMES C. DALEY.